(12) United States Patent
Chila et al.

(10) Patent No.: US 9,038,396 B2
(45) Date of Patent: May 26, 2015

(54) COOLING APPARATUS FOR COMBUSTOR TRANSITION PIECE

(75) Inventors: Ronald James Chila, Greer, SC (US); David Purnell, Hendersonville, NC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 2051 days.

(21) Appl. No.: 12/099,352

(22) Filed: Apr. 8, 2008

(65) Prior Publication Data

US 2009/0252593 A1    Oct. 8, 2009

(51) Int. Cl.
*F01D 9/02* (2006.01)
*F01D 25/12* (2006.01)
*F02C 7/18* (2006.01)

(52) U.S. Cl.
CPC ............... *F01D 9/023* (2013.01); *F01D 25/12* (2013.01); *F02C 7/18* (2013.01); *Y02T 50/675* (2013.01); *F05D 2230/21* (2013.01); *F05D 2230/232* (2013.01)

(58) Field of Classification Search
USPC ............ 60/39.35, 39.37, 752, 754, 755, 757, 60/760, 804, 806, 776; 415/191
See application file for complete search history.

(56) References Cited

U.S. PATENT DOCUMENTS

| | | | | |
|---|---|---|---|---|
| 3,175,361 A * | 3/1965 | Schirmer et al. | ................ | 60/746 |
| 3,736,747 A * | 6/1973 | Warren | ........................... | 60/732 |
| 4,201,047 A * | 5/1980 | Warren et al. | ................ | 60/39.63 |
| 4,872,312 A * | 10/1989 | Iizuka et al. | .................... | 60/760 |
| 4,903,477 A * | 2/1990 | Butt | ........................... | 60/39.37 |
| 7,082,766 B1 * | 8/2006 | Widener et al. | ................. | 60/752 |
| 7,137,241 B2 * | 11/2006 | Martling et al. | ............. | 60/39.37 |
| 7,404,286 B2 * | 7/2008 | Lior | ............................ | 60/39.35 |
| 2005/0044857 A1 * | 3/2005 | Glezer et al. | .................... | 60/772 |
| 2007/0022758 A1 * | 2/2007 | Myers et al. | .................... | 60/776 |
| 2007/0245741 A1 * | 10/2007 | Johnson et al. | ................. | 60/752 |
| 2008/0072603 A1 * | 3/2008 | Commaret et al. | ............. | 60/752 |

* cited by examiner

*Primary Examiner* — Ehud Gartenberg
*Assistant Examiner* — Arun Goyal
(74) *Attorney, Agent, or Firm* — Cantor Colburn LLP

(57) ABSTRACT

Disclosed is an apparatus for cooling a transition piece of a combustor includes at least one wrapper disposed at the transition piece located outboard of the transition piece. At least one support boss is located between the at least one wrapper and the transition piece. The at least one support boss, the at least one wrapper, and transition piece define at least one cooling flow channel for directing flow for cooling the transition piece. A method of cooling a transition piece of a combustor includes flowing cooling flow into at least one cooling flow channel located at the transition piece, the at least one cooling flow channel defined by the transition piece, at least one wrapper located at the transition piece and located outboard of the transition piece, and at least one support boss located between the at least one wrapper and the transition piece. The cooling flow is directed via the at least one support boss and flows across an outer surface of the transition piece thereby cooling the transition piece.

20 Claims, 3 Drawing Sheets

COOLING APPARATUS FOR COMBUSTOR TRANSITION PIECE

BACKGROUND

The subject invention relates to gas turbines. More particularly the subject invention relates to cooling of gas turbine components.

A typical gas turbine includes a plurality of combustors arranged in an annular array about a rotatable shaft. The combustors receive a combustible fuel from a fuel supply and compressed air from a compressor that is driven by the shaft. The fuel is combusted in the compressed air within the combustor to produce hot combustion gas. The combustion gas is expanded through a turbine to produce work for driving the shaft. The hot combustion gas is conveyed from the combustors to the turbine by a respective plurality of transition ducts. The hot combustion gas flowing through the transition duct subjects the duct structure to very high temperatures. Typically, cooling is provided to the transition ducts by impingement flow directed from passing airflow through impingement holes at discreet locations in a sleeve enveloping the transition duct. This method, however, is generally effective for cooling the transition duct at the impingement hole locations.

BRIEF DESCRIPTION OF THE INVENTION

According to one aspect of the invention, an apparatus for cooling a transition piece of a combustor includes at least one wrapper disposed at the transition piece located outboard of the transition piece. At least one support boss is located between the at least one wrapper and the transition piece. The at least one support boss, the at least one wrapper, and transition piece define at least one cooling flow channel for directing flow for cooling the transition piece.

According to another aspect of the invention, a method of cooling a transition piece of a combustor includes flowing cooling flow into at least one cooling flow channel located at the transition piece, the at least one cooling flow channel defined by the transition piece, at least one wrapper located at the transition piece and located outboard of the transition piece, and at least one support boss located between the at least one wrapper and the transition piece. The cooling flow is directed via the at least one support boss and flows across an outer surface of the transition piece thereby cooling the transition piece.

According to yet another aspect of the invention, a gas turbine includes at least one combustion chamber and at least one turbine. At least one transition piece is located in flow communication with the at least one combustion chamber and the at least one turbine for conveying combustion gas from the at least one combustion chamber to the at least one turbine. At least one wrapper is located at the at least one transition piece and located outboard of the at least one transition piece. At least one support boss is disposed between the at least one wrapper and the at least one transition piece. The at least one support boss, the at least one wrapper, and the at least one transition piece define at least one cooling flow channel for directing cooling flow for the at least one transition piece.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
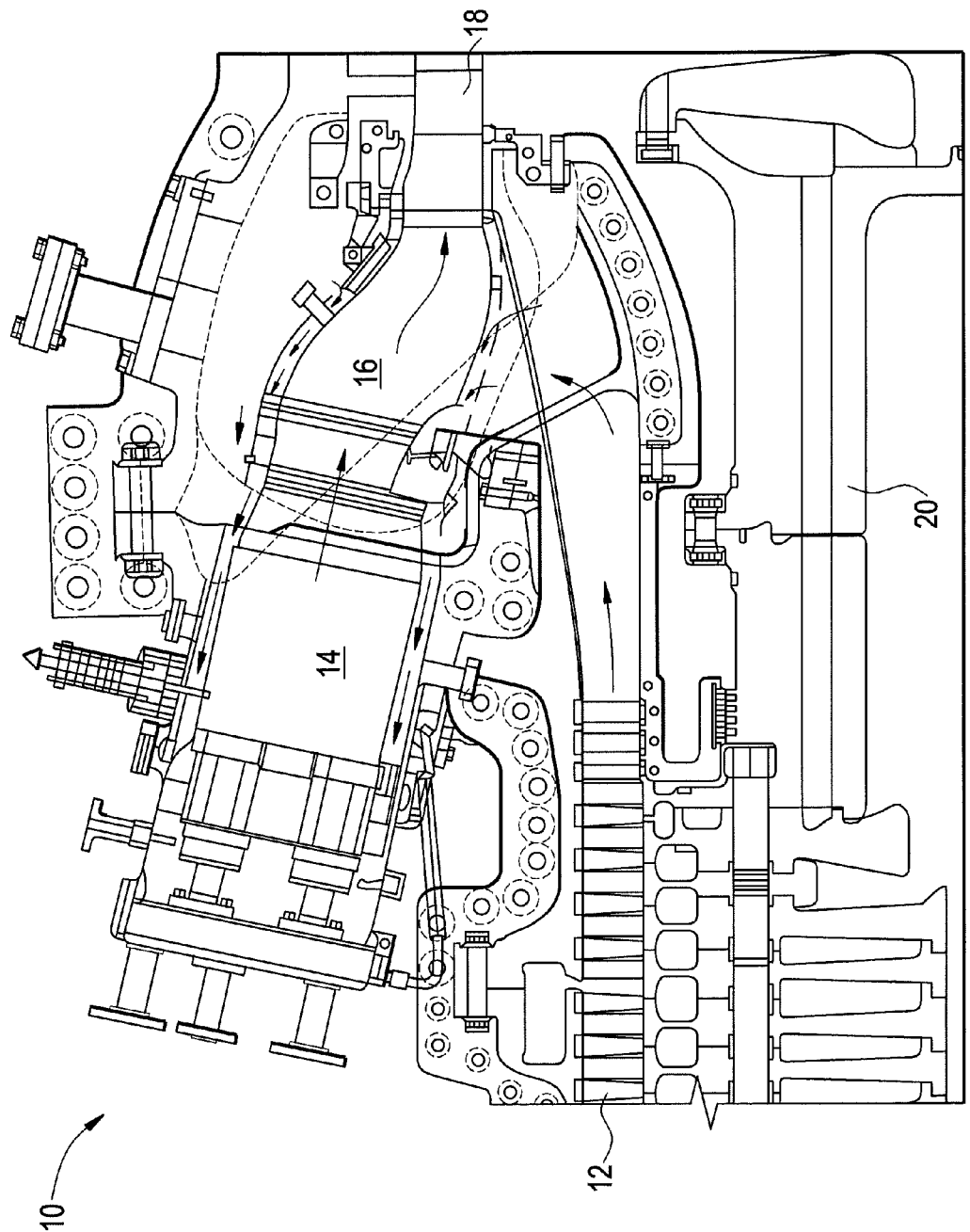
FIG. 1 is a partial cross-sectional view of an embodiment of a gas turbine.
Figure 2:
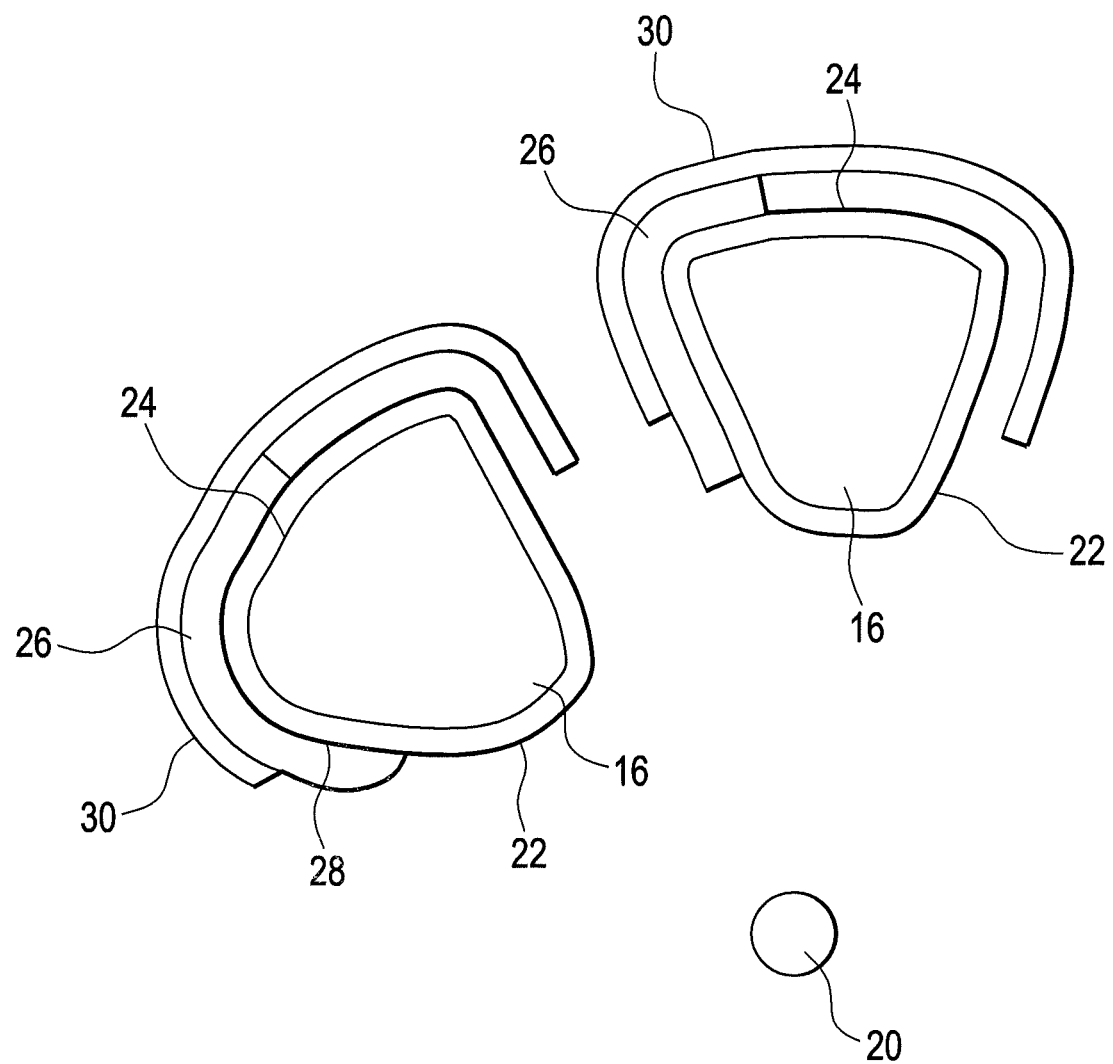
FIG. 2 is a partial axial cross-sectional view illustrating an embodiment of an arrangement of transition pieces in the gas turbine of FIG. 1.

Shown in FIG. 1 is a gas turbine 10. The gas turbine 10 includes a compressor 12 which provides compressed fluid to at least one combustor 14. Fuel is injected into the at least one combustor 14, mixes with the compressed air and is ignited and combusted. The hot gas product of the combustion flows from each combustor 14 through a corresponding transition piece 16 to a turbine 18 which extracts work from the hot gas to drive a rotor shaft 20 which in turn drives the compressor 12. The combustors 14 and transition pieces 16 in the embodiment of FIG. 1 are arranged in an annular array around the rotor shaft 20, as best shown in FIG. 2.

Figure 3:
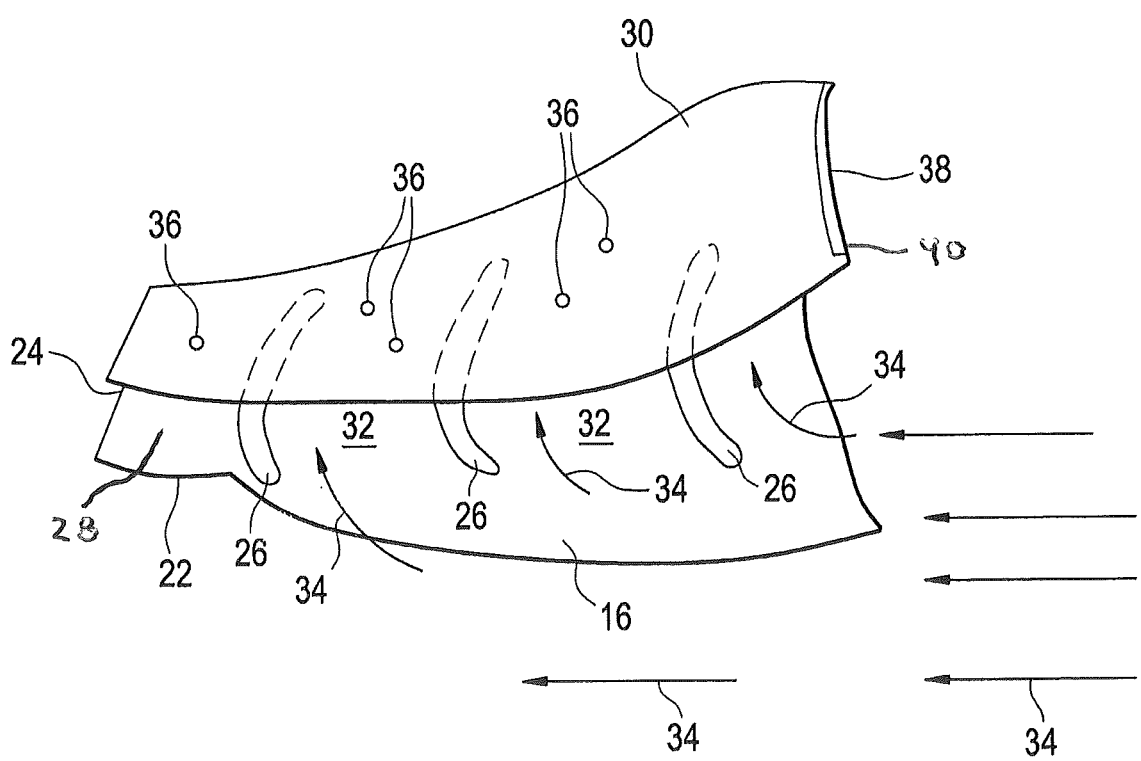
FIG. 3 is a plan view of an embodiment of a cooling apparatus of a transition piece of the gas turbine of FIG. 1.

Each transition piece 16 has a closed cross section for conveying the hot gas, and may include an inboard portion 22 disposed radially closest to the rotor shaft 20 and an outboard portion 24 disposed radially farthest from the rotor shaft 20. As shown in FIG. 3, one or more support bosses, for example, airfoils 26, are disposed at the transition piece 16 and extend from an outer surface 28 of the transition piece 16. In some embodiments, the one or more airfoils 26 are secured to the transition piece 16 by, for example, casting or welding. Referring again to FIG. 2, the one or more airfoils 26 are configured and disposed to support a wrapper 30 which extends over at least a portion of the transition piece 16. The wrapper 30 may formed from metal or other suitable materials and in some embodiments may be secured to the one or more airfoils 26 by any number of conventional means, for example, welding or casting.

As shown in FIG. 3, the at least one airfoil 26, the wrapper 30 and the outer surface 28 of the transition piece 16 define at least one cooling flow channel 32. Discharge flow 34 from the compressor 12 flows into the at least one cooling flow channel 32 where the discharge flow 34 is redirected by the at least one airfoil 26 across the outer surface 28 of the transition piece 16 to cool the transition piece 16. The airfoils 26 shown in FIG. 3 redirect the discharge flow in a substantially circumferential direction, but it is to be appreciated that other airfoil 26 configurations to redirect the discharge flow 34 in other directions, and even patterns, are contemplated by the present disclosure.

In the embodiment of FIG. 3, the wrapper 30 is disposed at the outboard portion 24 of the transition piece 16. In this embodiment, the inboard portion 22 of the transition piece 16 is cooled by substantially axially flowing discharge flow 34. A portion of the discharge flow 34, for example, the portion which flows between adjacent transition pieces 16, flows into the at least one cooling flow channel 32. The portion of the discharge flow 34 is redirected by the at least one airfoil 26 to flow across the outer surface 28 of the outboard portion 24 of the transition piece 16, thus providing cooling to the outboard portion 24.

In some embodiments, the wrapper 30 may include one or more wrapper holes 36 which allow additional discharge flow 34 into the at least one cooling flow channel 32 at desired locations to improve cooling effectiveness. Additionally, the at least one airfoil 26 may vary in size, airfoil shape, and placement to enhance a rate of heat transfer and to enhance a uniformity of distribution of the discharge flow 34 to further improve cooling. Further, in some embodiments, a leading edge 38 of the wrapper 30 includes, for example, a radiused edge 40 which reduces a pressure drop of discharge flow 34 entering the at least one cooling flow channel 32 thereby enhancing cooling efficiency of the cooling flow channels 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for cooling a transition piece of a combustor comprising:
   at least one wrapper disposed at the transition piece located outboard of the transition piece; and
   at least one support boss disposed between the at least one wrapper and the transition piece, the at least one support boss, the at least one wrapper, and transition piece defining at least one cooling flow channel for directing flow for cooling the transition piece, the at least one support boss redirecting the flow from a substantially axially-directed flow to a substantially circumferentially-directed flow.

2. The apparatus of claim 1 wherein the at least one support boss is at least one airfoil.

3. The apparatus of claim 1 wherein the flow is discharge flow from a compressor.

4. The apparatus of claim 1 wherein the at least one wrapper is formed from a metal.

5. The apparatus of claim 1 wherein the at least one support boss is secured to at least one of the at least one wrapper and the transition piece.

6. The apparatus of claim 5 wherein the at least one support boss is secured to at least one of the at least one wrapper and the transition piece by welding.

7. The apparatus of claim 1 wherein the at least one wrapper includes at least one wrapper hole for providing additional flow into the at least one cooling flow channel.

8. The apparatus of claim 1 wherein the at least one wrapper includes a leading edge having a radius for reducing a pressure drop at an entrance to the at least one cooling flow channel.

9. A gas turbine comprising:
   at least one combustion chamber;
   at least one turbine;
   at least one transition piece disposed in flow communication with the at least one combustion chamber and the at least one turbine for conveying combustion gas from the at least one combustion chamber to the at least one turbine;
   at least one wrapper disposed at the at least one transition piece and located outboard of the at least one transition piece; and
   at least one support boss disposed between the at least one wrapper and the at least one transition piece, the at least one support boss, the at least one wrapper, and the at least one transition piece defining at least one cooling flow channel for directing cooling flow for cooling the at least one transition piece, the at least one support boss redirecting the flow from a substantially axially-directed flow to a substantially circumferentially-directed flow.

10. The gas turbine of claim 9 wherein the at least one support boss is at least one airfoil.

11. The gas turbine of claim 9 wherein the cooling flow is discharge flow from a compressor.

12. The gas turbine of claim 9 wherein the at least one wrapper is at least partially disposed between adjacent transition pieces of the at least one transition piece.

13. The gas turbine of claim 9 wherein the at least one wrapper is formed from a metal.

14. The gas turbine of claim 9 wherein the at least one support boss is secured to at least one of the at least one wrapper and the at least one transition piece.

15. The gas turbine of claim 14 wherein the at least one support boss is secured to at least one of the at least one wrapper and the at least one transition piece by welding.

16. The gas turbine of claim 9 wherein the at least one wrapper includes at least one wrapper hole for providing additional flow into the at least one cooling flow channel.

17. The gas turbine of claim 9 wherein the at least one wrapper includes a leading edge having a radius for reducing a pressure drop at an entrance to the at least one cooling flow channel.

18. A method of cooling a transition piece of a combustor comprising:
   flowing cooling flow into at least one cooling flow channel disposed at the transition piece, the at least one cooling flow channel defined by the transition piece, at least one wrapper disposed at the transition piece and located outboard of the transition piece, and at least one airfoil disposed between the at least one wrapper and the transition piece;
   directing the cooling flow from a substantially axially-directed cooling flow to a substantially circumferentially-directed cooling flow via the at least one airfoil;
   flowing the cooling flow across an outer surface of the transition piece thereby cooling the transition piece.

19. The method of claim 18 including inputting additional cooling flow into the at least one cooling flow channel via at least one wrapper hole disposed in the at least one wrapper.

20. The method of claim 18 wherein the cooling flow is discharge flow from a compressor.

* * * * *